US012759189B2

(12) United States Patent
Clement et al.

(10) Patent No.: US 12,759,189 B2
(45) Date of Patent: Oct. 13, 2026

(54) TOUCHLESS OVERLAY PAPER HOLD DOWN APPARATUS

(71) Applicant: LOUISIANA-PACIFIC CORPORATION, Nashville, TN (US)

(72) Inventors: Jordan Clement, Dawson Creek (CA); Gord Richardson, Taylor (CA)

(73) Assignee: LOUISIANA-PACIFIC CORP., Nashville, TN (US)

( * ) Notice: Subject to any disclaimer, the term of this patent is extended or adjusted under 35 U.S.C. 154(b) by 71 days.

(21) Appl. No.: 18/911,150

(22) Filed: Oct. 9, 2024

(65) Prior Publication Data

US 2025/0114968 A1 Apr. 10, 2025

Related U.S. Application Data

(60) Provisional application No. 63/544,653, filed on Oct. 18, 2023, provisional application No. 63/543,239, filed on Oct. 9, 2023.

(51) Int. Cl.

| | |
|---|---|
| ***B27N 3/00*** | (2006.01) |
| ***B27N 3/12*** | (2006.01) |
| ***B27N 3/16*** | (2006.01) |
| ***B27N 3/18*** | (2006.01) |

(52) U.S. Cl.

CPC ................. *B27N 3/16* (2013.01); *B27N 3/12* (2013.01); *B27N 3/18* (2013.01)

(58) Field of Classification Search

CPC ............... B27N 3/16; B27N 3/12; B27N 3/18

USPC ....................................................... 106/162.5

See application file for complete search history.

(56) References Cited

U.S. PATENT DOCUMENTS

2017/0173820 A1* 6/2017 Sperlich ................. B27N 3/002

FOREIGN PATENT DOCUMENTS

| | | | | |
|---|---|---|---|---|
| CA | 2177548 C | * | 5/2008 | ............... B05D 7/06 |
| DE | 102012019051 B4 | * | 8/2022 | ........... B65H 11/002 |

OTHER PUBLICATIONS

DE-102012019051-B4 (Grasmück ) Aug. 2022 (online machine translation), [Retrieved on Jan. 29, 2026]. Retrieved from: Espacenet (Year: 2022).*

International Search Report and Written Opinion, PCT/US24/050598, Lousiana-Pacific Corp. (international filing date Oct. 9, 2024).

* cited by examiner

*Primary Examiner* — James E Mcdonough

(74) *Attorney, Agent, or Firm* — Wayne Edward Ramage; Baker Donelson

(57) ABSTRACT

An apparatus and related methods for touchlessly holding down overlay paper on a lignocellulosic composite mat as the mat and overlay are loaded into a multi-level press from a matching multi-level loader cage. In several exemplary embodiments, each level of the loader cage has a pressured air plenum, pipe, or tube, with a uniform continuous opening (gap, slit) extending linearly from which pressurized air exits. Depending on the configuration, the pressured air exits in a focused, laminar flow pattern.

5 Claims, 5 Drawing Sheets

TOUCHLESS OVERLAY PAPER HOLD DOWN APPARATUS

This application claims benefit of and priority to U.S. Provisional App. No. 63/543,239, filed Oct. 9, 2023, and U.S. Provisional App. No. 63/544,653, filed Oct. 18, 2023, both of which are incorporated herein in their entireties by specific reference for all purposes.

FIELD OF INVENTION

This invention relates to an apparatus and related methods for holding down overlay paper on a lignocellulosic composite mat as the mat and overlay are loaded into a multi-level press.

BACKGROUND OF INVENTION

Oriented, multilayer wood strand boards (OSB) are composed of several layers of thin wood strands, which are wood particles having a length which is several times greater than their width. These strands are formed by slicing larger wood pieces so that the fiber elements in the strands are substantially parallel to the strand length. The strands in each layer are positioned relative to each other with their length in substantial parallel orientation and extending in a direction approaching a line which is parallel to one edge of the layer. The layers are positioned relative to each other with the oriented strands of adjacent layers perpendicular, forming a layer-to-layer cross-oriented strand pattern. Oriented, multilayer wood strand boards of the above-described type, and examples of processes for pressing and production thereof, are described in detail in U.S. Pat. Nos. 3,164,511, 4,364,984, 5,435,976, 5,470,631, 5,525,394, 5,718,786, and 6,461,743, all of which are incorporated herein in their entireties by specific reference for all purposes.

Certain oriented board products can be made from flakes that are created from debarked round logs by placing the edge of a cutting knife parallel to a length of the log and the slicing thin flakes from the log. The cut flakes are subjected to forces that break the flakes into strands having a length parallel to the grain of the wood several times the width of the strand. The strands can be oriented on the board-forming machine with the strands predominantly oriented in a single (e.g., cross-machine) direction in one (e.g., core) layer and predominantly oriented in the generally perpendicular (machine) direction in adjacent layers. The various layers are bonded together by natural or synthetic resins under heat and pressure in a press (typically a multi-level press able to press several boards simultaneously) to make the finished product. Oriented, multilayer wood strand boards of the above-described type are produced with bending, tensile strengths and face strengths comparable to those of commercial softwood plywood.

One or more layers of an engineered, cellulose or non-cellulose (e.g., paper) based overlay may also be added to the strand mat prior to multi-level pressing. However, the paper overlay often will “roll back” on one of more of the levels, which can cause the press not to completely close, resulting in defects in the quality of, or complete loss of, the resulting composite products in all levels of the press, as well as down time due to changing of press plates, scraping embossing plates, inspecting the press, and similar pre/post curative measures. Roll backs can result from ambient air movement (e.g., wind or air drafts in the facility), and/or air movement within or near the press due to the heat of the press. This problem also raises safety issues, as line operators have to closely interact (e.g., grinding, scraping, and cleaning) with a hot press on a daily basis.

SUMMARY OF INVENTION

In various exemplary embodiments, the present invention comprises an apparatus and related methods for touchlessly holding down overlay paper on a lignocellulosic composite mat as the mat and overlay are loaded into a multi-level press from a matching multi-level loader cage. In several exemplary embodiments, each level of the loader cage has a pressured air plenum, pipe, or tube, with a uniform continuous opening (gap, slit) extending linearly from which pressurized air exits. Depending on the configuration, the pressured air exits in a focused, laminar flow pattern.

The pipes or tubes, and associated tubing for transmission of pressurized air, may be made of any suitable material able to withstand the air pressure and the ambient operating conditions, such as temperature/heat. In one exemplary embodiment, the material is stainless steel, steel, or other form of metal, able to withstand heat from proximity to the press.

The pipes or tubes are located horizontally at each level on the side proximate the press. Operation is controlled by a Programmable Logic Controller (PLC) or similar controller. As the mats and paper overlays are simultaneously fed into the corresponding press layers, pressured air is emitted through the gap/slit, applying focused air pressure against the corresponding paper overlay to hold it against the respective mat, and preventing the paper overlay from “rolling back.” Air first starts being applied after the near end of the mat and paper have passed into the press (e.g., one-eighth to halfway into the press level), for about 3 to 5 or 6 seconds total to ensure that the paper remains in place during the loading process. The time will vary depending on the configuration of press and loader, but is chosen so as to prevent the emitted air from causing the front or back edge of the paper overlay from blowing up or away from the underlying mat. The pipes/tubes are plumbed with air from the plant or facility, and comprise a regulator and solenoid.

DETAILED DESCRIPTION OF EXEMPLARY EMBODIMENTS

Figure 1:
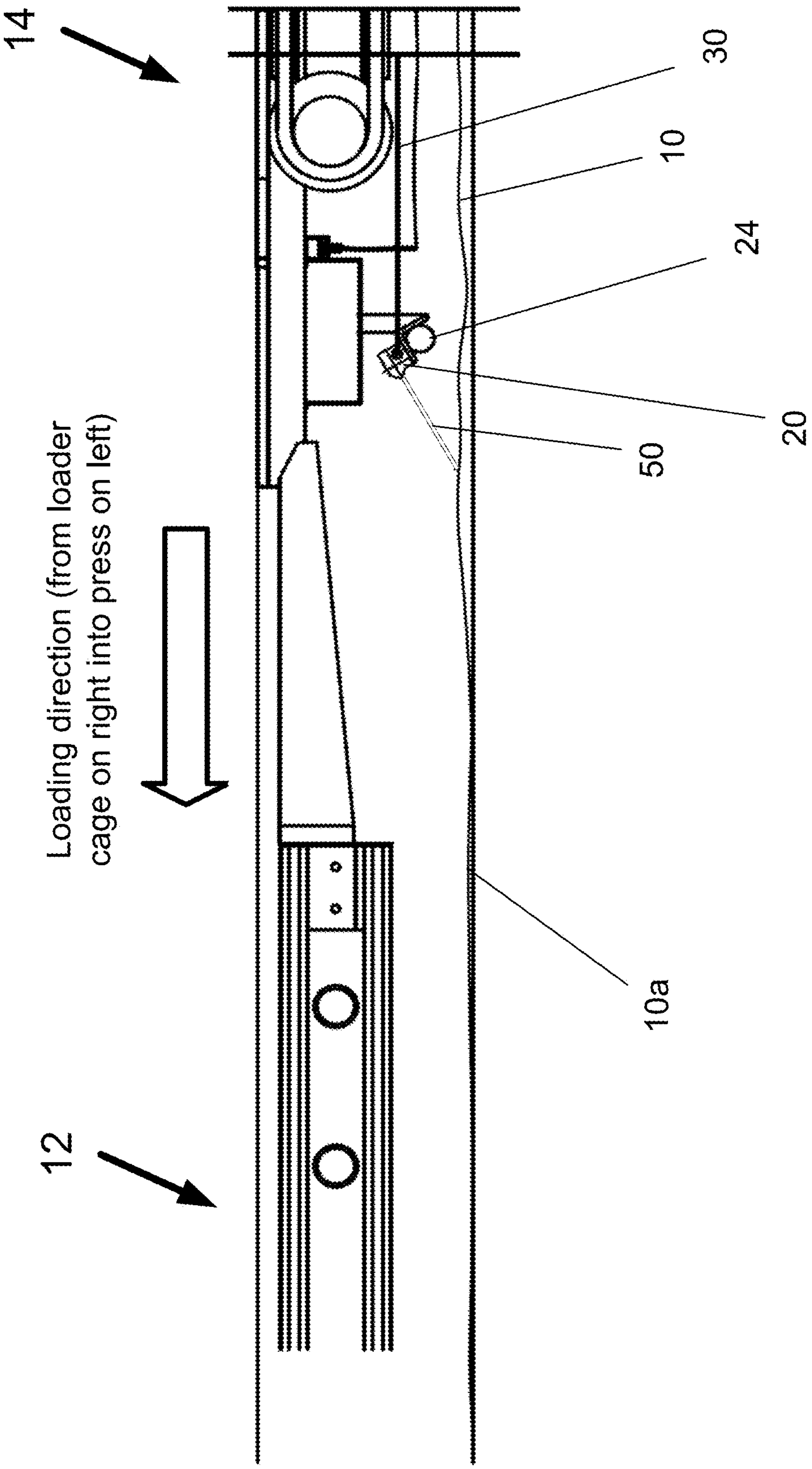
FIG. 1 shows a close-up side view of an exemplary embodiment of the present invention.
Figure 2:
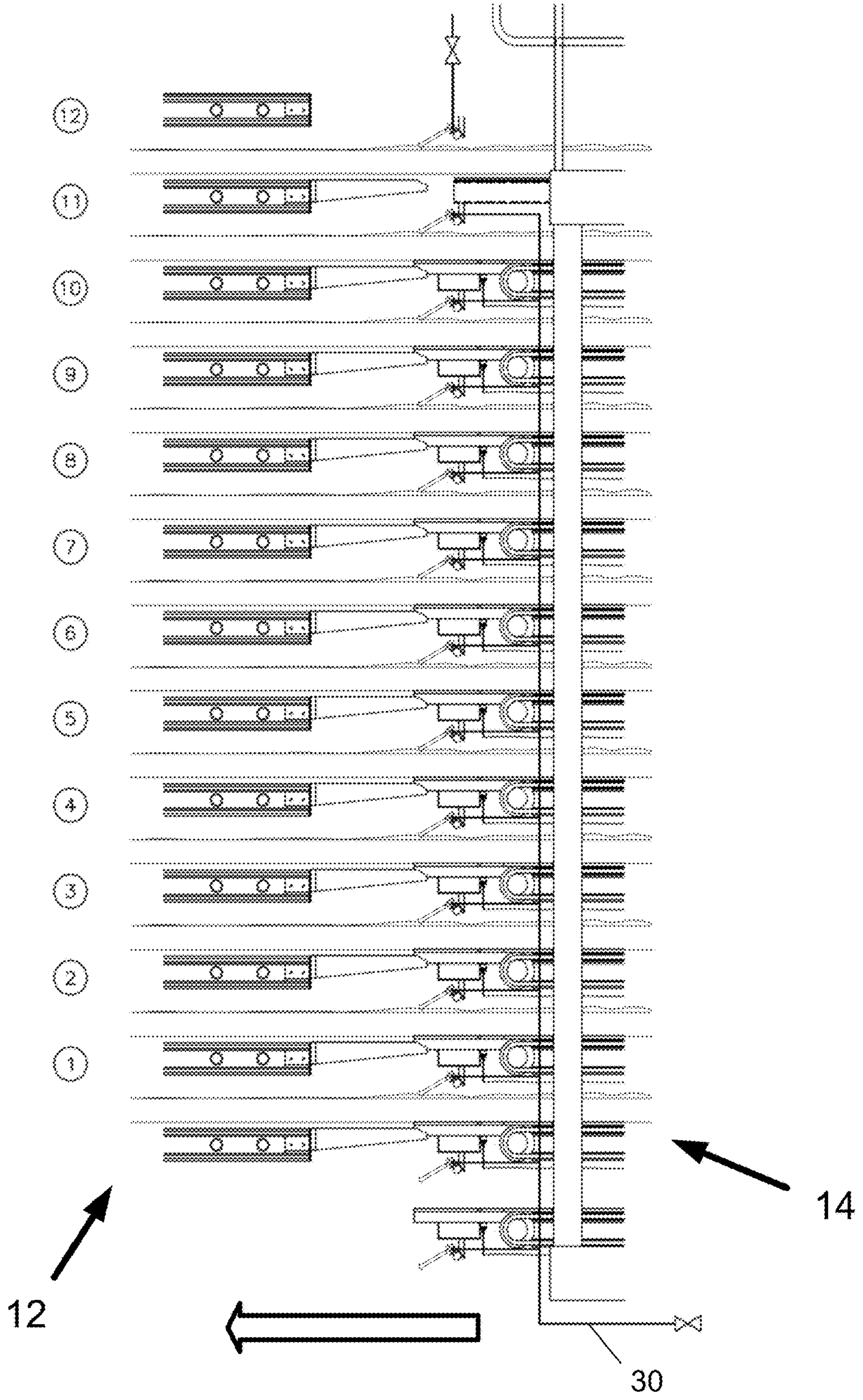
FIG. 2 shows a view of the present invention on multiple levels of a multi-level loader cage in proximity to a press.

In various exemplary embodiments, the present invention comprises an apparatus and related methods for touchlessly holding down overlay paper 10 on a lignocellulosic composite mat (such as an oriented strand board, or OSB, mat) as the mat and overlay 10 on a conveying production line are loaded into a multi-level press 12 from a matching multi-level loader cage 14. In several exemplary embodiments, as seen in FIGS. 1 and 2, each level of the loader cage 14 has a pressured air plenum, pipe, or tube 20 with a uniform continuous, in whole or in part, opening (such as, but not limited to, a gap or slit) 22 extending linearly along the edge or side of the plenum, pipe or tube 20 from which pressurized air exits 50. Depending on the configuration, the pressurized air exits 50 in a focused, laminar flow pattern.

The plenum, pipes or tubes 20, and associated tubing 30 for transmission of pressurized air, may be made of any suitable material able to withstand the air pressure and the ambient operating conditions, including, but not limited to, ambient temperature or heat. In one exemplary embodiment, the material is stainless steel, steel, or other form of metal, able to withstand heat and/or higher temperatures from proximity to the press.

As seen in the figures, the plenum, pipes or tubes 20 are located horizontally at each level on the side of the loader cage 14 proximate the press 12. Operation is controlled by a Programmable Logic Controller (PLC) or other controller. As the mats and paper overlays are simultaneously fed into the corresponding press layers, pressured air is emitted through the gap/slit, applying focused air pressure against the corresponding paper overlay to hold it against the respective mat, and preventing the paper overlay from "rolling back." Air first starts being applied after the near end of the mat and paper have passed into the press (e.g., one-eighth to halfway into the press level), for about 3 to 6 seconds total to ensure that the paper remains in place during the loading process. The time will vary depending on the configuration of press and loader, but is chosen so as to prevent the emitted air from causing the front or back edge of the paper overlay from blowing up or away from the underlying mat. The pipes/tubes are plumbed with air from the plant or facility, and comprise a regulator and solenoid.

Figure 5:
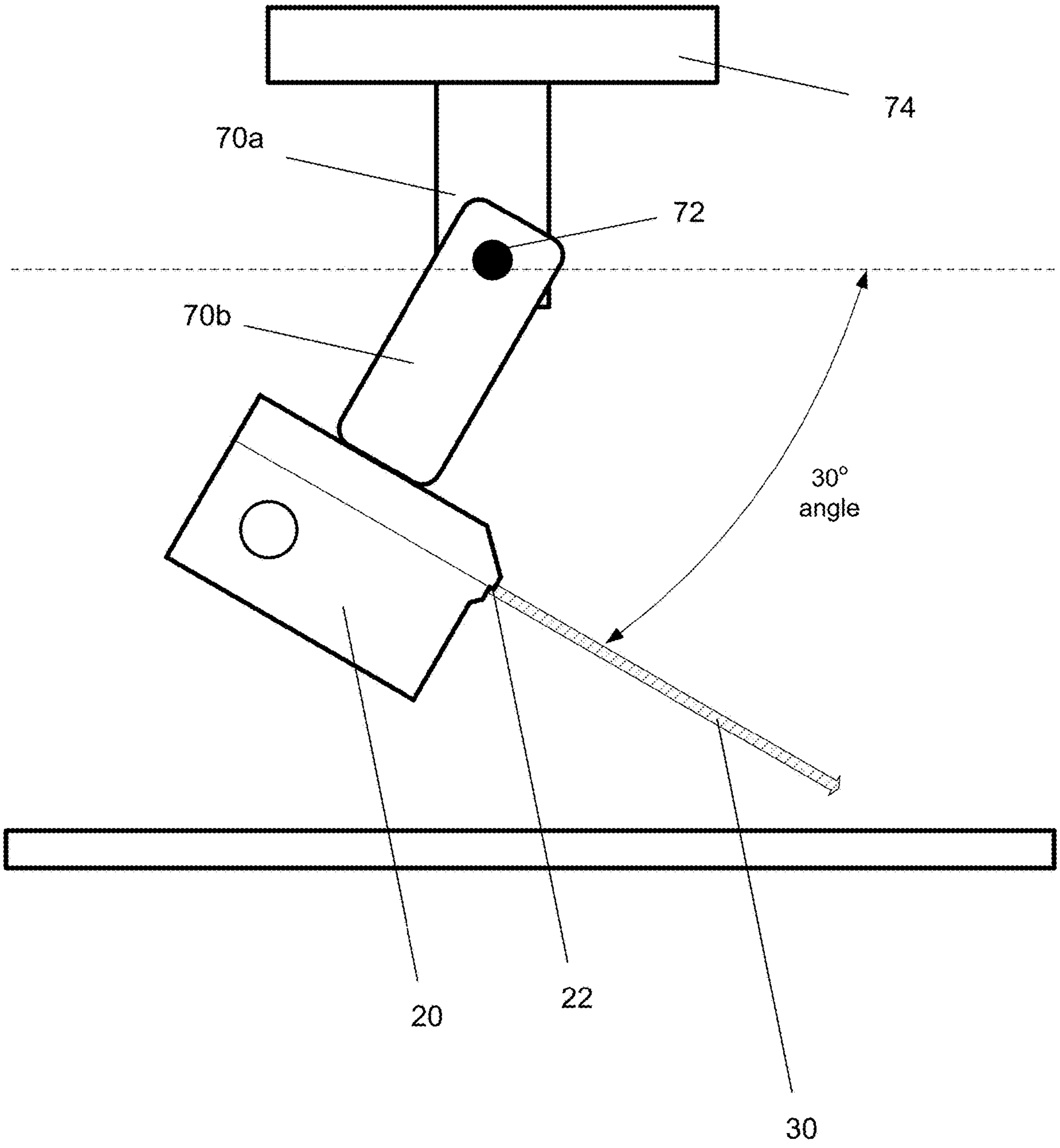
FIG. 5 shows a side view of the present invention pivotally mounted from a machine frame component at a 30 degree angle with respect to the horizontal plane or the overlay.

In preferred embodiments, the applied air pressure is blown at 80-90 psi at a relatively low flow rate and at a 25 to 30 degrees forward angle (i.e., in the direction of the press) with respect to the horizontal or the paper overlay, as seen in FIG. 5 (although other angles may be used, ranging from 10 degrees to 45 degrees, depending on the weight of the overlay and the distance from the invention to the overlay). This creates an area of higher pressure air above the width of the paper overlay as it enters the press or proceeds further down the infeed conveyor. The length of the pipe or tube may be 11 inches to 48 inches, which are sufficient for an 8 foot wide mat and paper overlay (due to lateral flow along the width of the paper overlay). The length may vary depending on the level: for example, a 48 inch pipe may be needed for the topmost level where the paper overlay may be more exposed to random air currents or flows in the facility, while an 11-12 inch pipe will suffice for the lower levels. In one embodiment, a 1.5 inch diameter pipe is used to feed pressurized air to the lower levels, while a 1 inch diameter pipe is used to feed pressurized air to the topmost level.

FIG. 5 shows an example of the present invention pivotally mounted to an overhead machine or frame component 74 by means of an upper bracket 70*a* with two downward arms, mounted or affixed to the component 74, and a lower bracket 70*b* with two upward arms, mounted or affixed to the top of the plenum, tube or pipe 22. The upper bracket and lower bracket are pivotally connected by one or more bolts or similar fasteners extending through corresponding holes in the sides of the arms of each brackets. Loosening the fasteners allows the present invention to be set at the desired angle, and the fasteners then can be tightened to hold the invention at that angle.

As indicated above, the timing of the firing/activation of the emission of pressurized air 50 in conjunction with the operation of the loader 14 is important. Proper operation requires sequenced timing of the emission of the pressurized air to the top of the overlay as it passes underneath the invention and into the press. In one exemplary embodiment, when running in automatic mode, the cycle runs as follows:

Loader hoist cannot be running, loader hoist has to be at the top, transfer boom needs to be fully extended: This state turns on a "press loading in progress" bit in the controller that has a one-half second off delay timer.

Line control needs to be in "Auto" mode, the press loading off delay timer needs to be on, the "recipe" needs to be a valid recipe for "siding" (the pipes/tubes are turned off for runs where the recipe is for "OSB", as OSB runs generally do not apply a paper overlay in the fashion described herein): This state turns on the "air pressure permit" bit.

The "air pressure permit" bit needs to be on, the "press chains forward run coil" need to be on: This state fires the emission of pressurized air.

An on delay timer shuts off the emission of pressurized air after 6 seconds.

While running in manual mode, the line control needs to be in "Jog", the transfer boom needs to be fully extended, and the screens cannot be on the press limits. These indicators are on a second branch of the "air pressure permit" bit.

Figure 3:
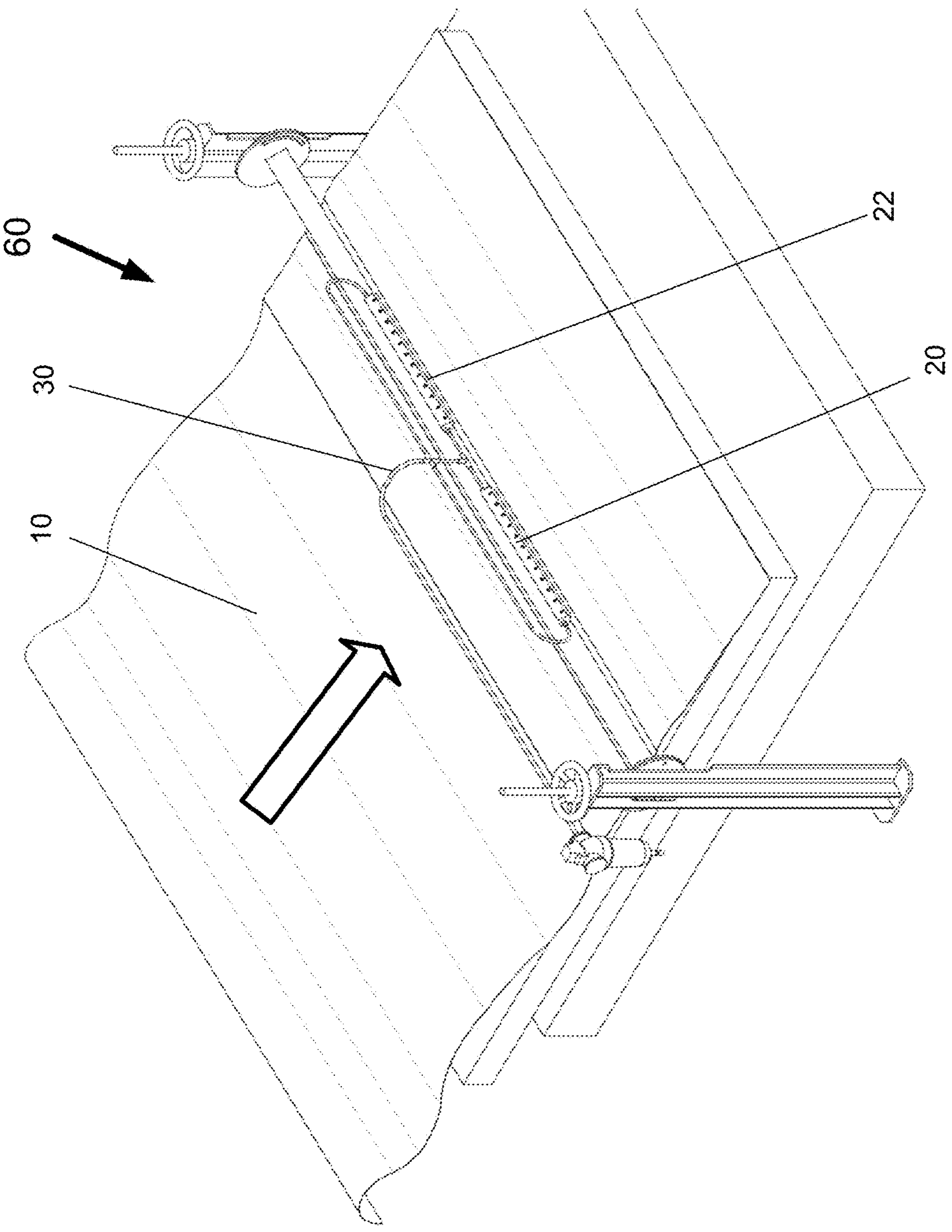
FIG. 3 shows a perspective view of the present invention on a storage or infeed conveyor.
Figure 4:
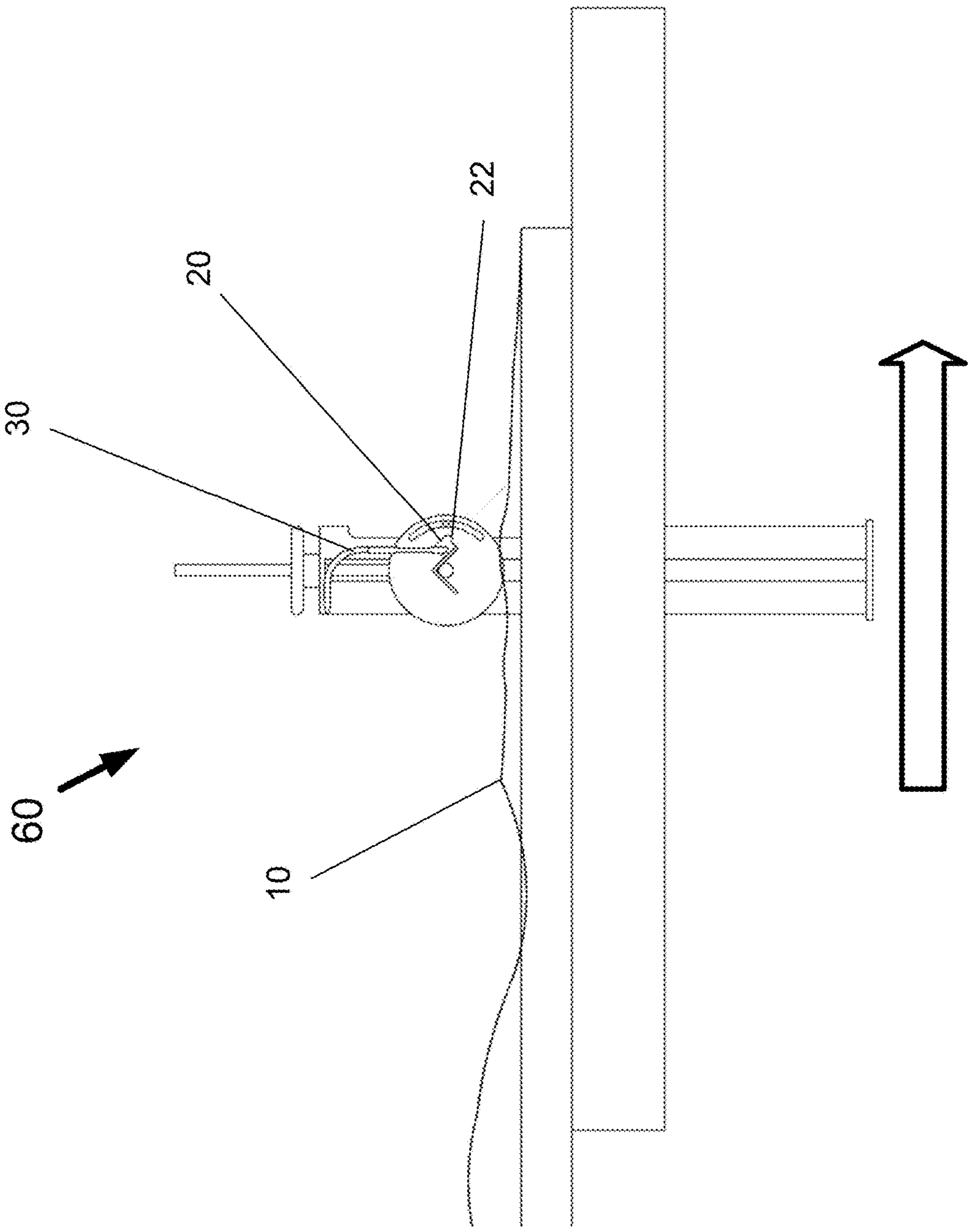
FIG. 4 shows a side view of FIG. 3.

In a further exemplary embodiment, as seen in FIGS. 3 and 4, embodiments of the invention may be used on a storage conveyer 60 to provide pressurized air 50 as the conveyor introduces paper overlays 10 to the mats to help ensure that the paper overlays are properly placed on the mats in the loader.

The timing of air emission for the storage conveyor also is controlled. In one exemplary embodiment, the cycle runs as follows:

Storage conveyor forward run coil, not on loader lug start 2 prox, storage conveyor follow loader lug, both the slow down and stop prox's on the storage conveyor need to be on, the recipe has to be a valid siding recipe, the on delay timer cannot be done; then the loader lug start prox 1 through a one shot will turn the "storage air pressure permit" bit on which seals in everything except the timer done bit: This state turns on the "storage permit" bit.

"Storage air pressure permit" bit needs to be on, the on delay timer preset (based on line speed, and increasing with slower line speed; e.g., at 90 ft/min, the timer preset is 3700 ms) cannot be done: This turns on the solenoid coil (fires the emission of pressurized air).

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A method for loading a lignocellulosic composite mat with an overlay into a press, comprising:

placing a paper overlay on a top surface of a lignocellulosic composite mat on an infeed conveyor;

inserting the lignocellulosic composite mat and paper overlay into a holder in a loader cage;

moving the lignocellulosic composite mat and paper overlay from the loader cage through an exit opening into a corresponding opening in a press; and applying pressurized air at an angle to the lignocellulosic composite mat and paper overlay as they move from the loader cage through the exit opening.

2. The method of claim 1, wherein the step of applying pressurized air comprises the step of directly pressurized air from a linear opening in a pressured air plenum.

3. The method of claim 2, wherein the pressured air plenum is attached to the loader cage above the exit opening.

4. The method of claim 1, wherein the pressurized air is applied onto the overlay at an applied pressure in a range of from 80 to 90 psi.

5. The method of claim 1, wherein the pressurized air is directed onto the overlay at an angle in a range of from 20 to 30 degrees with respect to the overlay.

* * * * *